(12) United States Patent
Kaul et al.

(10) Patent No.: US 6,540,820 B1
(45) Date of Patent: Apr. 1, 2003

(54) HETEROCYCLIC COMPOUNDS

(75) Inventors: Bansi Lal Kaul, Biel-Benken (CH); Bruno Piastra, Huningue (FR); Valérie Wolf, Galfingue (FR)

(73) Assignee: Clariant Finance (BVI) Limited, Tortola (BG)

( * ) Notice: Subject to any disclaimer, the term of this patent is extended or adjusted under 35 U.S.C. 154(b) by 171 days.

(21) Appl. No.: 09/590,524

(22) Filed: Jun. 8, 2000

(30) Foreign Application Priority Data

Jun. 18, 1999 (GB) ............................................ 9914173

(51) Int. Cl.⁷ ..................... C09D 11/00; C07D 513/02
(52) U.S. Cl. ................... 106/31.47; 106/31.77; 106/498; 544/1
(58) Field of Search ................... 106/31.47, 31.77, 106/498; 544/1

(56) References Cited

U.S. PATENT DOCUMENTS

| 3,376,298 A | * | 4/1968 | Braun et al. .............. 106/31.77 |
| 3,408,349 A | * | 10/1968 | Matsunaga ...................... 544/1 |
| 3,716,534 A | * | 2/1973 | Sieja ........................ 106/31.77 |
| 4,992,101 A | * | 2/1991 | Jaffe et al. .................... 106/498 |
| 5,021,573 A | | 6/1991 | Bitterli et al. |
| 6,046,335 A | | 4/2000 | Boeglin et al. |
| 6,200,378 B1 | * | 3/2001 | Piastra et al. ............... 106/413 |
| 6,277,536 B1 | | 9/2001 | Piastra et al. |
| 6,375,732 B1 | | 4/2002 | Kaul et al. |

OTHER PUBLICATIONS

British Search Report, 9/99.
K. Takagi, M. Kawabe, M. Matsuoka, & T, Kitao, Dyes & Pigments, 1985, vol. 6(3), p. 177–188, No month available.
N.L. Agarwal & R.L. Mital, Egypt, J. Chem., 1977, vol. 20, No. 2, p. 205–208, No month available.
Journal of Chemical and Engineering Data, 1975, vol. 20, No., 2, p. 199–201, No month available.
Journal Heterocyclic Chemistry, vol. 24, p. 91–94, 1/87.
Journal Heterocyclic Chemistry, Bvol. 23, p. 589–592, 3/86.
Journal of Soc. Dyers Colour, vol. 102 (Jul./Aug.) p. 232–236, 7/86.
Phosphorus, Sulfur Silicon Relat. Elem., vol. 80, p. 223–231, 9/94.
Phosphorus, Sulfur Silicon Relat. Elem., vol. 80, p. 23–29, 3/93.
U.S. Ser. No. 09/905,803, filed Jul. 13, 2001, Kaul, et al.

* cited by examiner

Primary Examiner—Helene Klemanski
(74) Attorney, Agent, or Firm—Anthony A. Bisulca

(57) ABSTRACT

Compounds of the formula:

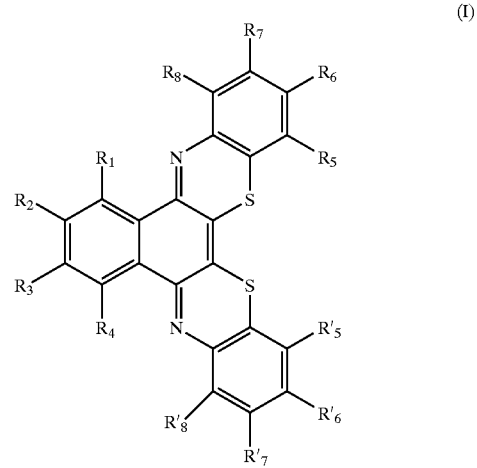

(I)

where $R_1$, $R_2$, $R_3$, $R_4$, $R_5$, $R_6$, $R_7$, $R_8$, $R'_5$, $R'_6$, $R'_7$, $R'_8$ are hydroxy —$NO_2$, —CN, —$CF_3$, —$CONH_2$, $C_{1-12}$alkyl, phenyl, naphthyl, phenanthryl, anthryl, $R_9R_{10}N$—, $R_9$—O— or $R_9$—S—, —$CONHR_{10}$, —$CONR_9R_{10}$ in which $R_9$ and $R_{10}$ are $C_1$–$C_6$-alkyl, $C_6$–$C_{10}$-aryl, $(C_6$–$C_{10})$-aryl-$(C_1$–$C_6)$-alkyl or $(C_1$–$C_6)$-alkyl-$(C_6$–$C_{10})$-aryl, in which the alkyl and/or aryl radicals can optionally be substituted by hydroxyl, $C_1$–$C_6$-alkoxy, $C_6$–$C_{10}$-aryloxy or halogen; and optionally, two adjacent groups can form an isocyclic or heterocyclic group;

are eminently suitable for the mass coloring of polymers, in particular polar polymers, for coloring toners, powders and powder coating materials as well as for coloring ink-jet inks.

16 Claims, No Drawings

HETEROCYCLIC COMPOUNDS

The present invention relates to colorants for the mass coloring of polymers. In the mass coloring of polar polymers in particular, examples being polyamides, polyesters, polycarbonates and ABS, stringent requirements in terms of their heat stability and light fastness are expected from the dyes used.

The object of the present invention is, therefore, to provide heat-stable, light-fast and readily polymer-soluble colorants.

It has been found that the compounds of the formula (I) defined below achieve the stated object.

The invention, therefore, relates to the use as a polymer-soluble colorant of a compound of the formula (I)

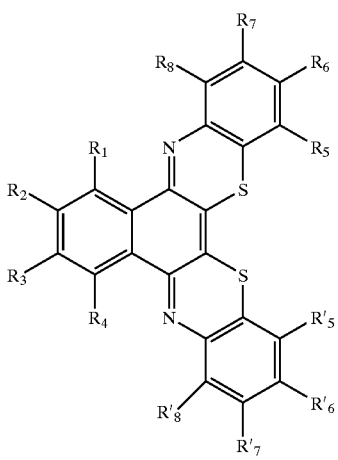

(I)

in which $R_1$, $R_2$, $R_3$, $R_4$, $R_5$, $R_6$, $R_7$, $R_8$, $R'_5$, $R'_6$, $R'_7$, $R'_8$ are hydrogen, halogen, hydroxy, —$NO_2$, —CN, —$CF_3$, —$CONH_2$, $C_{1-12}$alkyl, phenyl, naphthyl, phenanthryl, anthryl, $R_9R_{10}N$—, $R_9$—O— or $R_9$—S—, —$CONHR_{10}$, —$CONR_9R_{10}$ in which $R_9$ and $R_{10}$ are $C_1$–$C_6$-alkyl, $C_6$–$C_{10}$-aryl, ($C_6$–$C_{10}$)-aryl-($C_1$–$C_6$)-alkyl or ($C_1$–$C_6$)-alkyl-($C_6$–$C_{10}$)-aryl, in which the alkyl and/or aryl radicals can be substituted by hydroxyl, $C_1$–$C_6$-alkoxy, $C_6$–$C_{10}$-aryloxy or halogen; and optionally two adjacent groups can form an isocyclic or heterocyclic group.

Preferred compounds of the formula (I) are those in which each $R_1$, $R_2$, $R_3$, $R_4$ is hydrogen, halogen, methyl or nitro.

Compounds of the formula (I) which are also preferred are those in which $R_5$, $R_6$, $R_7$, $R_8$, $R'_5$, $R'_6$, $R'_7$, $R'_8$ are hydrogen, methyl, chlorine, —$CF_3$ or $CONH_2$.

Preference is also given to compounds of the formula (I) in which two adjacent groups of the series $R_{5-8}$ and $R'_{5-8}$ form heterocyclic rings of the following type:

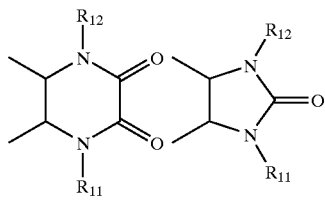

in which $R_{11}$, $R_{12}$ are independently hydrogen, $C_{1-12}$alkyl, phenyl, naphthyl, phenanthryl.

Particular preference is given to compounds of the formula (I) in which $R_{11}$, and $R_{12}$ are methyl, ethyl, phenyl.

Novel compounds according to the invention have the structure of formula (I) in which at least one of the substitutents $R_1$, $R_2$, $R_3$, $R_4$, $R_5$, $R_6$, $R_7$, $R_8$, $R'_5$, $R'_6$, $R'_7$ or $R'_8$ has the meaning —CN, —$CF_3$, —$CONH_2$, phenyl, naphthyl, phenanthryl, anthryl, $R_9R_{10}N$—, —$CONHR_{10}$ or —$CONR_9R_{10}$ as defined above, as well as the compounds where two adjacent groups form an isocyclic or heterocyclic group.

The present invention also provides a process for preparing the novel compounds of the formula (I) as defined above, characterized in that a naphtoquinone of the formula (II)

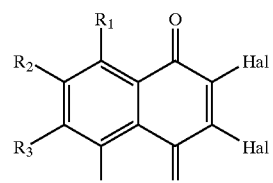

(II)

in which Hal is halogen, preferably Cl or Br, is condensed with compounds of the formula (IIIa) and (IIIb)

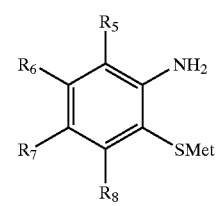

(IIIa)

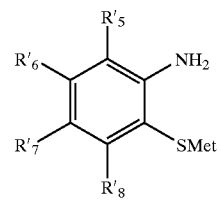

(IIIb)

in which Met is hydrogen, $Na^+$, $K^+$ or $Zn^{2+}$.

Condensation takes place in a molar ratio of (II):(IIIa): (IIIb) of approx. 1:1:1.

Condensation can be conducted without solvent in the melt at temperatures, for instance, of between 150° C. and 300° C., preferably up to 250° C., or in an inert solvent at temperatures between 25° C. and 300° C., preferably between 100° and 250° C., in the presence or absence of a catalyst, at atmospheric pressure or under pressure.

Examples of suitable solvents are relatively high-boiling aliphatic or aromatic, substituted or unsubstituted hydrocarbons, examples being xylene (mixture), biphenyl, nitrobenzene, chlorobenzenes, chloronaphthalene, glycol ethers, organic acids and acid amides, especially dimethylformamide, dimethylacetamide or N-methylpyrrolidone.

Examples of possible catalysts are inorganic or organic acids, such as hydrochloric or sulphuric acid, benzenesulphonic, toluenesulphonic acid, or acetic acid. The salts of organic acids, such as sodium or potassium acetate, are in many cases also suitable as catalysts.

Whereas the compound of formula (IV)

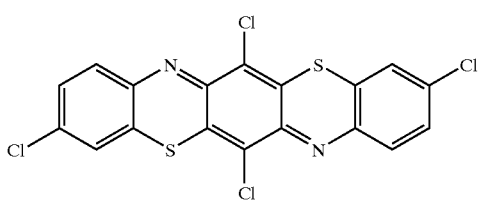

(IV)

is not heat stable in polyester or polyamides, it is surprising that the compound of formula (V) for example is heat stable in polyamide (up to 300° C.) and also in polyester up to 320° C. The compound of formula (V) has also a very good light fastness in polyester.

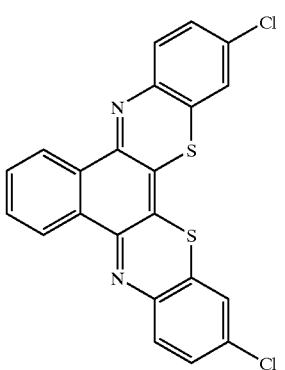

(V)

The compounds of the invention are eminently suitable for the coloring of melts of synthetic polar polymers such as, for example, ABS, polyester, polycarbonate or polyamides. Polyamides are, for example, polycondensation products or addition polymerization products of dicarboxylic acids and diamines, e.g. of adipic acid and hexamethylenediamine, of lactams, e.g. ε-caprolactam, or of aminocarboxylic acids, e.g. ω-aminoundecanoic acid. The polyamide melt mixed with the pigment is brought into its final form by conventional methods—for example, in melt spinning, injection molding, extrusion or film blowing machines.

Some of the dyes of formula (I) give a fluorescent coloration in synthetic polar polymers such as, for example, ABS, polyester, polycarbonate or polyamides.

The dyes of the formula (I) are extremely stable to the heat stress which is necessarily part of the coloring of synthetic polyamides, and the substrates mass-colored with them also display excellent fastness properties, especially light fastness. Their high polymer-solubility is particularly noteworthy.

The compounds of the formula (I) are also suitable as colorants in electrophotographic toners and developers, such as one- or two-component powder toners (also called one- or two-component developers), magnetic toners, liquid toners, polymerization toners and specialty toners (literature: L. B. Schein, "Electrophotography and Development Physics"; Springer Series in Electrophysics 14, Springer Verlag, $2^{nd}$ Edition, 1992).

Typical toner binders are addition polymerization, polyaddition and polycondensation resins, such as styrene, styrene-acrylate, styrene-butadiene, acrylate, polyester and phenol-epoxy resins, polysulphones, polyurethanes, individually or in combination, and also polyethylene and polypropylene, which may comprise further constituents, such as charge control agents, waxes or flow assistants, or may be modified subsequently with these additives.

The compounds of the formula (I) are suitable, furthermore, as colorants in powders and powder coating materials, especially in triboelectrically or electrokinetically sprayable powder coating materials which are used for the surface coating of articles made, for example, from metal, wood, plastic, glass, ceramic, concrete, textile material, paper or rubber (J. F. Hughes, "Electrostatics Powder Coating" Research Studies, John Wiley & Sons, 1984).

Powder coating resins that are typically employed are epoxy resins, carboxyl- and hydroxyl-containing polyester resins, polyurethane resins and acrylic resins, together with customary hardeners. Combinations of resins are also used. For example, epoxy resins are frequently employed in combination with carboxyl- and hydroxyl-containing polyester resins. Typical hardener components (as a function of the resin system) are, for example, acid anhydrides, imidazoles and also dicyanodiamide and its derivatives, blocked isocyanates, bisacylurethanes, phenolic and melamine resins, triglycidyl isocyanurates, oxazolines and dicarboxylic acids.

In addition, the compounds of the formula (I) are suitable as colorants in ink-jet inks, both aqueous and non-aqueous, and in those inks which operate in accordance with the hot-melt process.

In the examples below, parts are by weight.

EXAMPLE 1

57.9 parts of 2,3-dichloronaphtoquinone are suspended in 250 parts of N,N-dimethylformamide. 69 parts of o-aminothiophenol (purity 95%) are added to the suspension at 20° C. over a period of 2 hours and then heated at 100° C. for 2 hours. The suspension is then cooled to 40° C. and filtered. The cake is washed with dimethylformamide, ethanol and dried. This gives 73.6 parts of violet powder, 80% of theory. Mp: 280–3° C.

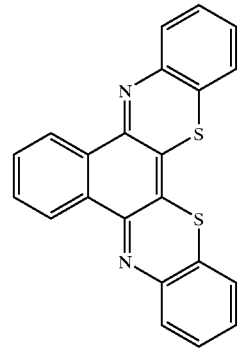

When applied in polyester, this compound gives a very bright magenta transparent color.

EXAMPLE 2

57.9 parts of 2,3-dichloronaphtoquinone are suspended in 250 parts of N,N-dimethylformamide. 95.7 parts of 2-amino-5chlorothiophenol are added to the suspension over a period of 2 hours and then heated at 100° C. for 16 hours. The suspension is then cooled to 90° C. and filtered. The cake is washed with hot dimethylformamide, methanol and dried. This gives 40.5 parts of violet powder. Mp: 383–5° C.

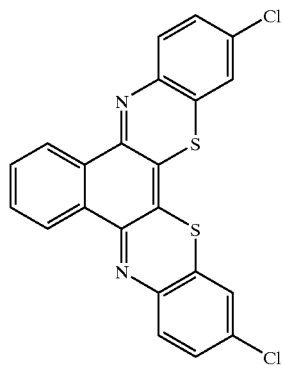

When applied in polyester, this compound gives a very bright magenta transparent color.

EXAMPLE 3

116.6 parts of the following compound

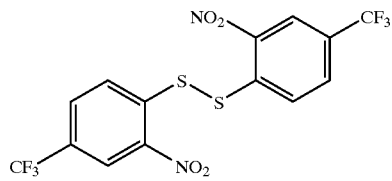

and 121.1 parts of zinc powder are suspended in 500 parts of ethanol, and heated to 70° C. 541.7 parts of concentrated hydrochloric acid are then carefully added over a period of 2 hours. The reduction is exothermic, the temperature is maintained at 70° C. by removing the oil bath. The reaction mixture is further refluxed one hour and then filtered hot. The solution is introduced in a reactor and cooled to 30° C. 44.5 parts of 2,3-dichloronaphtoquinone are then added into the reactor. The mixture is then heated to reflux for 16 hours. The suspension is filtered at 60° C., washed with hot ethanol and hot water, and then dried. 80.9 parts of a violet solid are obtained. Mp 260–263° C.

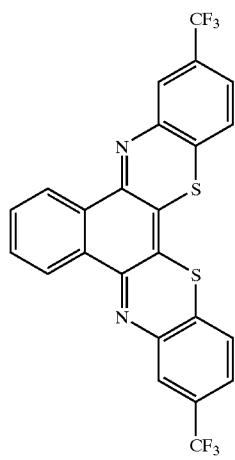

When applied in polyester, this compound gives a very reddish violet transparent color.

EXAMPLE 4

86.8 parts of the following compound

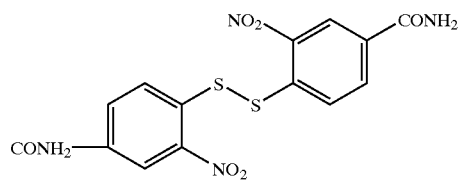

and 100.72 parts of zinc powder are suspended in 600 parts of ethanol, and heated to 70° C. 381.1 parts of concentrated hydrochloric acid are then carefully added over a period of 2 hours. The reduction is exothermic, the temperature is maintained at 70° C. by removing the oil bath. The reaction mixture is further refluxed one hour and then filtered hot. The solution is introduced in a reactor and cooled to 30° C. 45.41 parts of 2,3-dichloronaphtoquinone are then added into the reactor. The mixture is then heated to reflux for 16 hours. The suspension is filtered at 60° C., washed with hot ethanol and hot water, and then dried. 45.4 parts of a violet solid are obtained.

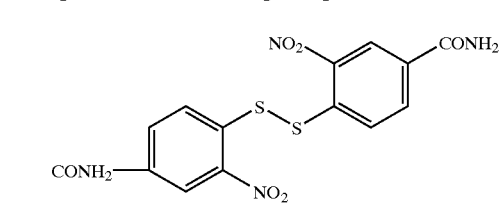

When applied in polyester, this compound gives a violet transparent color.

EXAMPLE 5

90.8 parts of the following compound

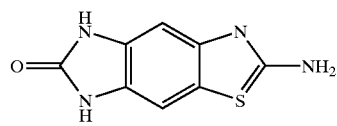

are added to 176.5 parts of a sodium hydroxide solution 50% heated at 105° C. The mixture is stirred during 7 hours at this temperature. Then the mixture is cooled down, diluted with 250 parts of water at room temperature and stirred during 10 hours. The suspension is filtered under nitrogen through a fritted glaze (porosity 3). The filtrate containing the following sodium salt

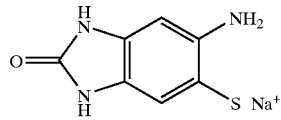

in solution, is then added at room temperature to a mixture of 50 parts of 2,3-dichloronaphtoquinone in 300 parts of water. The mixture becomes immediately violet and is then heated to reflux for 16 hours. The suspension is filtered at 60° C., washed with hot ethanol and hot water, and then dried. 98.6 g of a violet solid are obtained.

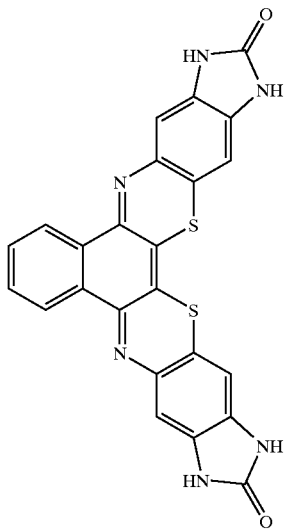

When applied in polyester, this compound gives a violet transparent color.

USE EXAMPLE 100 parts of polycaprolactam in the form of a powder are mixed with 0.1 and with 1.0 part respectively of the dye from Example 2 in powder form in a drum mixer. After a short time, the powder is uniformly distributed and adheres to the granules. After about 10 minutes, the mixture is dried at 120° C. for 16 hours, transferred to a melt spinning machine and following a residence time of about 8 minutes is spun to fibers at 275–280° C. under a nitrogen atmosphere. The magenta-colored fibers are extremely lightfast.

All other known synthetic polyamides (nylon, Perlon, etc.) can be mass-colored in the same way, as can polyesters, ABS and polycarbonates, using the compounds of examples 1 to 5.

What is claimed is:
1. A polymer-soluble colorant of the formula:

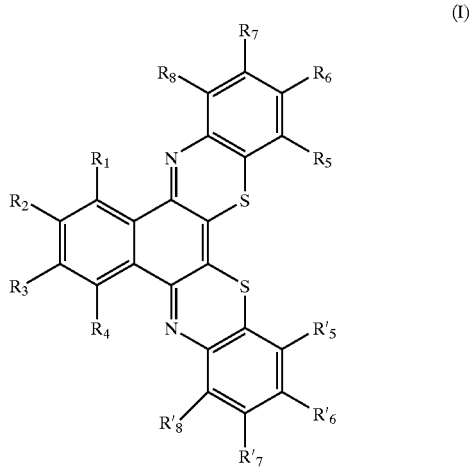

(I)

where $R_1$, $R_2$, $R_3$, $R_4$, $R_5$, $R_6$, $R_7$, $R_8$, $R'_5$, $R'_6$, $R'_7$, $R'_8$ are halogen, hydroxy, —$NO_2$, —CN, —$CF_3$, —$CONH_2$, $C_{1-12}$alkyl, phenyl, naphthyl, phenanthryl, anthryl, $R_9R_{10}N$—, $R_9$—O— or $R_9$—S—, —$CONHR_{10}$, —$CONR_9R_{10}$ in which $R_9$ and $R_{10}$ are $C_1$–$C_6$-alkyl, $C_6$–$C_{10}$-aryl, ($C_6$–$C_{10}$)-aryl-($C_1$–$C_6$)-alkyl or ($C_1$–$C_6$)-alkyl-($C_6$–$C_{10}$)-aryl, in which the alkyl and/or aryl radicals can optionally be substituted by hydroxyl, $C_1$–$C_6$-alkoxy, $C_6$–$C_{10}$-aryloxy or halogen.

2. A polymer-soluble colorant according to claim 1, wherein $R_1$, $R_2$, $R_3$, $R_4$ are each selected from the group consisting of hydrogen, halogen, methyl and nitro.

3. A polymer-soluble colorant according to claim 1, wherein $R_5$, $R_6$, $R_7$, $R_8$, $R'_5$, $R'_6$, $R'_7$, $R'_8$ are each, selected from the group consisting of hydrogen, methyl, chlorine, —$CF_3$ and $CONH_2$.

4. A polymer-soluble colorant of the formula:

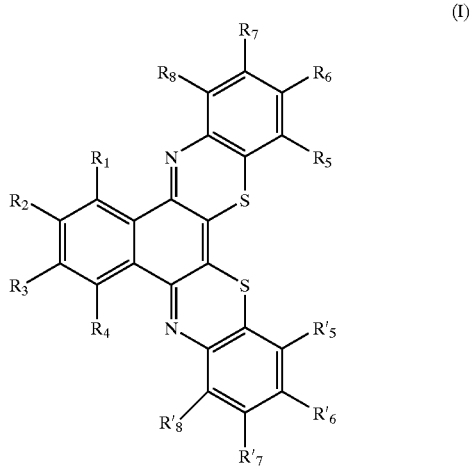

(I)

where $R_1$, $R_2$, $R_3$, $R_4$, are hydrogen, halogen, hydroxy, —$NO_2$, —CN, —$CF_3$, —$CONH_2$, $C_{1-12}$alkyl, phenyl, naphthyl, phenanthryl, anthryl, $R_9R_{10}N$—, $R_9$—O— or $R_9$—S—, —$CONHR_{10}$, —$CONR_9R_{10}$ in which $R_9$ and $R_{10}$ are $C_1$–$C_6$-alkyl, $C_6$–$C_{10}$-aryl, ($C_6$–$C_{10}$)-aryl-($C_1$–$C_6$)-alkyl or ($C_1$–$C_6$)-alkyl-($C_6$–$C_{10}$)-aryl, in which the alkyl and/or aryl radicals can optionally be substituted by hydroxyl, $C_1$–$C_6$-alkoxy, $C_6$–$C_{10}$-aryloxy or halogen; and wherein two adjacent groups of $R_{5-8}$ and $R'_{5-8}$ form heterocyclic rings of the following type:

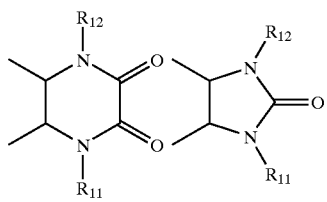

in which $R_{11}$, $R_{12}$ are independently hydrogen, $C_{1-12}$alkyl, phenyl, naphthyl.

5. A polymer-soluble colorant of the formula:

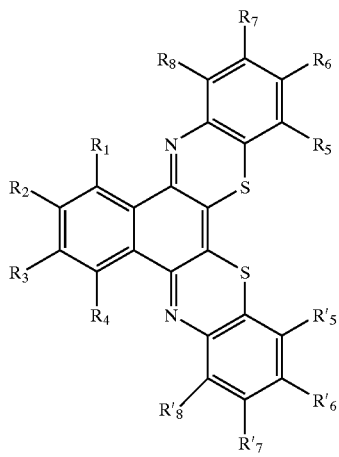
(I)

where $R_1$, $R_2$, $R_3$, $R_4$, $R_5$, $R_6$, $R_7$, $R_8$, $R'_5$, $R'_6$, $R'_7$, $R'_8$ are hydrogen, halogen, hydroxy, $-NO_2$, $-CN$, $-CF_3$, $-CONH_2$, $C_{1-12}$alkyl, phenyl, naphthyl, phenanthryl, anthryl, $R_9R_{10}N-$, $R_9-O-$ or $R_9-S-$, $-CONHR_{10}$, $-CONR_9R_{10}$ in which $R_9$ and $R_{10}$ are $C_1-C_6$-alkyl, $C_6-C_{10}$-aryl, $(C_6-C_{10})$-aryl-$(C_1-C_6)$-alkyl or $(C_1-C_6)$-alkyl-$(C_6-C_{10})$-aryl, in which the alkyl and/or aryl radicals can optionally be substituted by hydroxyl, $C_1-C_6$-alkoxy, $C_6-C_{10}$-aryloxy or halogen; and wherein at least one of the substitutents $R_1$, $R_2$, $R_3$, $R_4$, $R_5$, $R_6$, $R_7$, $R_8$, $R'_5$, $R'_6$, $R'_7$ or $R'_8$ has the meaning $-CN$, $-CF_3$, $-CONH_2$, phenyl, naphthyl, phenanthryl, anthryl, $R_9R_{10}N-$, $-CONHR_{10}$ or $-CONR_9R_{10}$.

6. A process for preparing the compounds of the formula (I), as claimed in claim 5, comprising reacting a compound of the formula:

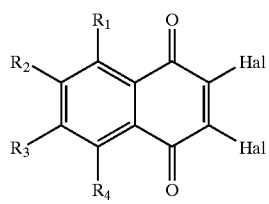
(II)

in which Hal is halogen and $R_1$, $R_2$, $R_3$ and $R_4$ are as defined in claim 5;

with a compound of the formula:

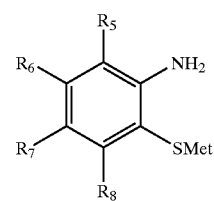
(IIIa)

where Met is hydrogen, $Na^+$, $K^+$ or $Zn^{2+}$ and $R_5$, $R_6$, $R_7$, $R_8$ are as defined in claim 5;

and with a compound of the formula:

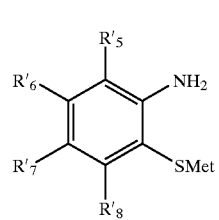
(IIIb)

where Met is hydrogen, $Na^+$, $K^+$ or $Zn^{2+}$ and $R'_5$, $R'_6$, $R'_7$, $R'_8$ are as defined in claim 5.

7. A method of coloring synthetic polar polymers comprising the steps of providing a synthetic polar polymer; adding an active amount of a colorant of formula I as claimed in claim 1; and mixing said synthetic polar polymer with said colorant.

8. A method of coloring toners comprising the steps of providing a toner; said toner is selected from the group consisting of: electrophotographic toners; electrophotographic developers; one-component powder toners; two-component powder toners; magnetic toners; liquid toners; polymerization toners; and specialty toners; adding an active amount of a colorant of formula I as claimed in claim 1; and mixing said toner with said colorant.

9. A method of coloring powders and powder coating material comprising the steps of providing a powders or a powder coating material; adding an active amount of a colorant of formula I as claimed in claim 1; and mixing said powders or said powder coating material with said colorant.

10. A method of coloring ink-jet inks comprising the steps of providing a ink-jet inks; adding an active amount of a colorant of formula I as claimed in claim 1; and mixing said ink-jet inks with said colorant.

11. The polymer-soluble colorant according to claim 1, wherein two adjacent groups form an isocyclic or heterocyclic group.

12. The polymer-soluble colorant according to claim 5, wherein two adjacent groups form an isocyclic or heterocyclic group.

13. A composition comprising the polymer-soluble colorant according to claim 1, wherein the composition is selected from the group consisting of electrophotographic toners, electrophotographic developers, one-component powder toners two-component powder toners; magnetic toners; liquid toners; polymerzation toners; powder coating materials, powders and an ink jet ink.

14. A composition comprising the polymer-soluble colorant according to claim 4, wherein the composition is selected from the group consisting of electrophotographic toners, electrophotographic developers, one-component powder toners two-component powder toners; magnetic toners; liquid toners; polymerization toners; powder coating materials, powders and an ink jet ink.

15. A composition comprising the polymer-soluble colorant according to claim 5, wherein the composition is selected from the group consisting of electrophotographic toners, electrophotographic developers, one-component powder toners two-component powder toners; magnetic toners; liquid toners; polymerization toners; powder coating materials, powders and an ink jet ink.

16. A polymer-soluble colorant of the formula:

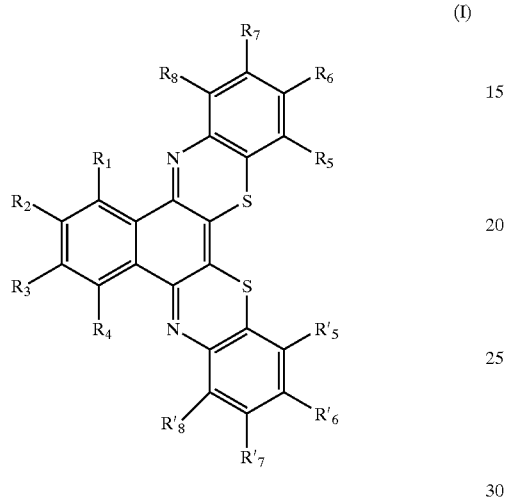

(I)

where $R_1$ is hydrogen, —CN, —CF$_3$, —CONH$_2$, $C_{1-12}$alkyl, phenyl, naphthyl, phenanthryl, anthryl, $R_9R_{10}N$—, $R_9$—O—, —CONHR$_{10}$, —CONR$_9$R$_{10}$ in which $R_9$ and $R_{10}$ are $C_1$–$C_6$-alkyl, $C_6$–$C_{10}$-aryl, ($C_6$–$C_{10}$)-aryl-($C_1$–$C_6$)-alkyl or ($C_1$–$C_6$)-alkyl-($C_6$–$C_{10}$)-aryl, in which the alkyl and/or aryl radicals can optionally be substituted by hydroxyl, $C_1$–$C_6$-alkoxy, $C_6$–$C_{10}$-aryloxy or halogen;

$R_2$ is hydrogen, halogen, hydroxy, —NO$_2$, —CN, —CF$_3$, —CONH$_2$, $C_{1-12}$alkyl, phenyl, naphthyl, phenanthryl, anthryl, $R_9R_{10}N$—, $R_9$—O— or $R_9$—S—, —CONHR$_{10}$, —CONR$_9$R$_{10}$ in which $R_9$ and $R_{10}$ are $C_1$–$C_6$-alkyl, $C_6$–$C_{10}$-aryl, ($C_6$–$C_{10}$)-aryl-($C_1$–$C_6$)-alkyl or ($C_1$–$C_6$)-alkyl-($C_6$–$C_{10}$)-aryl, in which the alkyl and/or aryl radicals can optionally be substituted by hydroxyl, $C_1$–$C_6$-alkoxy, $C_6$–$C_{10}$-aryloxy or halogen;

$R_3$, is hydrogen, hydroxy, —NO$_2$, —CN, —CF$_3$, —CONH$_2$, $C_{1-12}$alkyl, phenyl, naphthyl, phenanthryl, anthryl, $R_9R_{10}N$—, $R_9$—O—, —CONHR$_{10}$, —CONR$_9$R$_{10}$ in which $R_9$ and $R_{10}$ are $C_1$–$C_6$-alkyl, $C_6$–$C_{10}$-aryl, ($C_6$–$C_{10}$)-aryl-($C_1$–$C_6$)-alkyl or ($C_1$–$C_6$)-alkyl-($C_6$–$C_{10}$)-aryl, in which the alkyl and/or aryl radicals can optionally be substituted by hydroxyl, $C_1$–$C_6$-alkoxy, $C_6$–$C_{10}$-aryloxy or halogen;

$R_4$ is hydrogen, —NO$_2$, —CN, —CF$_3$, —CONH$_2$, $C_{1-12}$alkyl, phenyl, naphthyl, phenanthryl, anthryl, $R_9R_{10}N$—, $R_9$—O—, —CONHR$_{10}$, —CONR$_9$R$_{10}$ in which $R_9$ and $R_{10}$ are $C_1$–$C_6$-alkyl, $C_6$–$C_{10}$-aryl, ($C_6$–$C_{10}$)-aryl-($C_1$–$C_6$-alkyl or ($C_1$–$C_6$)-alkyl-($C_6$–$C_{10}$)-aryl, in which the alkyl and/or aryl radicals can optionally be substituted by hydroxyl, $C_1$–$C_6$-alkoxy, $C_6$–$C_{10}$-aryloxy or halogen;

$R_5$ is hydrogen, halogen, hydroxy, —NO$_2$, —CN, —CF$_3$, —CONH$_2$, $C_{1-12}$alkyl, phenyl, naphthyl, phenanthryl, anthryl, $R_9R_{10}N$—, $R_9$—O— or $R_9$—S—, —CONHR$_{10}$, —CONR$_9$R$_{10}$ in which $R_9$ and $R_{10}$ are $C_1$–$C_6$-alkyl, $C_6$–$C_{10}$-aryl, ($C_6$–$C_{10}$)-aryl-($C_1$–$C_6$)-alkyl or ($C_1$–$C_6$)-alkyl-($C_6$–$C_{10}$)-aryl, in which the alkyl and/or aryl radicals can optionally be substituted by hydroxyl, $C_1$–$C_6$-alkoxy, $C_6$–$C_{10}$-aryloxy or halogen;

$R_6$ is hydrogen, halogen, hydroxy, —NO$_2$, —CN, —CF$_3$, —CONH$_2$, $C_{1-12}$alkyl, phenyl, naphthyl, phenanthryl, anthryl, $R_9R_{10}N$—, $R_9$—O— or $R_9$—S—, —CONHR$_{10}$, —CONR$_9$R$_{10}$ in which $R_9$ and $R_{10}$ are $C_1$–$C_6$-alkyl, $C_6$–$C_{10}$-aryl, ($C_6$–$C_{10}$)-aryl-($C_1$–$C_6$)-alkyl or ($C_1$–$C_6$)-alkyl-($C_6$–$C_{10}$)-aryl, in which the alkyl and/or aryl radicals can optionally be substituted by hydroxyl, $C_1$–$C_6$-alkoxy, $C_6$–$C_{10}$-aryloxy or halogen;

$R_7$ is hydrogen, halogen, hydroxy, —NO$_2$, —CN, —CF$_3$, —CONH$_2$, $C_{1-12}$alkyl, phenyl, naphthyl, phenanthryl, anthryl, $R_9R_{10}N$—, $R_9$—O— or $R_9$—S—, —CONHR$_{10}$, —CONR$_9$R$_{10}$ in which $R_9$ and $R_{10}$ are $C_1$–$C_6$-alkyl, $C_6$–$C_{10}$-aryl, ($C_6$–$C_{10}$)-aryl-($C_1$–$C_6$)-alkyl or ($C_1$–$C_6$)-alkyl-($C_6$–$C_{10}$)-aryl, in which the alkyl and/or aryl radicals can optionally be substituted by hydroxyl, $C_1$–$C_6$-alkoxy, $C_6$–$C_{10}$-aryloxy or halogen;

$R_8$ is hydroxy, —NO$_2$, —CN, —CF$_3$, —CONH$_2$, phenyl, naphthyl, phenanthryl, anthryl, $R_9R_{10}N$—, $R_9$—O— or $R_9$—S—, —CONHR$_{10}$, —CONR$_9$R$_{10}$ in which $R_9$ and $R_{10}$ are $C_1$–$C_6$-alkyl, $C_6$–$C_{10}$-aryl, ($C_6$–$C_{10}$)-aryl-($C_1$–$C_6$-alkyl or ($C_1$–$C_6$)-alkyl-($C_6$–$C_{10}$)-aryl, in which the alkyl and/or aryl radicals can optionally be substituted by hydroxyl, $C_1$–$C_6$-alkoxy, $C_6$–$C_{10}$-aryloxy or halogen;

$R'_5$ is hydrogen, halogen, hydroxy, —NO$_2$, —CN, —CF$_3$, —CONH$_2$, $C_{1-12}$alkyl, phenyl, naphthyl, phenanthryl, anthryl, $R_9R_{10}N$—, $R_9$—O— or $R_9$—S—, —CONHR$_{10}$, —CONR$_9$R$_{10}$ in which $R_9$ and $R_{10}$ are $C_1$–$C_6$-alkyl, $C_6$–$C_{10}$-aryl, ($C_6$–$C_{10}$)-aryl-($C_1$–$C_6$)-alkyl or ($C_1$–$C_6$)-alkyl-($C_6$–$C_{10}$)-aryl, in which the alkyl and/or aryl radicals can optionally be substituted by hydroxyl, $C_1$–$C_6$-alkoxy, $C_6$–$C_{10}$-aryloxy or halogen;

$R'_6$ is —NO$_2$, —CN, —CF$_3$, —CONH$_2$, phenyl, naphthyl, phenanthryl, anthryl, $R_9R_{10}N$—, or $R_9$—S—, —CONHR$_{10}$, —CONR$_9$R$_{10}$ in which $R_9$ and $R_{10}$ are $C_1$–$C_6$-alkyl, $C_6$–$C_{10}$-aryl, ($C_6$–$C_{10}$)-aryl-($C_1$–$C_6$)-alkyl or ($C_1$–$C_6$)-alkyl-($C_6$–$C_{10}$)-aryl, in which the alkyl and/or aryl radicals can optionally be substituted by hydroxyl, $C_1$–$C_6$-alkoxy, $C_6$–$C_{10}$-aryloxy or halogen;

$R'_7$ is hydrogen, halogen, hydroxy, —NO$_2$, —CN, —CF$_3$, —CONH$_2$, $C_{1-12}$alkyl, phenyl, naphtnyl, phenanthryl, anthryl, $R_9R_{10}N$—, $R_9$—O— or $R_9$—S—, —CONHR$_{10}$, —CONR$_9$R$_{10}$ in which $R_9$ and $R_{10}$ are $C_1$–$C_6$-alkyl, $C_6$–$C_{10}$-aryl, ($C_6$–$C_{10}$)-aryl-($C_1$–$C_6$)-alkyl or ($C_1$–$C_6$)-alkyl-($C_6$–$C_{10}$)-aryl, in which the alkyl and/or aryl radicals can optionally be substituted by hydroxyl, $C_1$–$C_6$-alkoxy, $C_6$–$C_{10}$-aryloxy or halogen; and $R'_8$ is hydroxy, —NO$_2$, —CN, —CF$_3$, —CONH$_2$, phenyl, naphthyl, phenanthryl, anthryl, $R_9R_{10}N$—, $R_9$—O— or $R_9$—S—, CONHR$_{10}$, —CONR$_9$R$_{10}$ in which $R_9$ and $R_{10}$ are $C_1$–$C_6$-alkyl, $C_6$–$C_{10}$-aryl, ($C_6$–$C_{10}$)-aryl-($C_1$–$C_6$)-alkyl or ($C_1$–$C_6$)-alkyl-($C_6$–$C_{10}$)-aryl, in which the alkyl and/or aryl radicals can optionally be substituted by hydroxyl, $C_1$–$C_6$-alkoxy, $C_6$–$C_{10}$-aryloxy or halogen.

* * * * *